US009354755B2

(12) United States Patent
Den Boer et al.

(10) Patent No.: US 9,354,755 B2
(45) Date of Patent: May 31, 2016

(54) PROJECTED CAPACITIVE TOUCH PANEL WITH A SILVER-INCLUSIVE TRANSPARENT CONDUCTING LAYER(S)

(71) Applicant: Guardian Industries Corp., Auburn Hills, MI (US)

(72) Inventors: Willem Den Boer, Brighton, MI (US); Alexey Krasnov, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 150 days.

(21) Appl. No.: 13/685,871

(22) Filed: Nov. 27, 2012

(65) Prior Publication Data

US 2014/0145999 A1 May 29, 2014

(51) Int. Cl.
*G06F 3/044* (2006.01)

(52) U.S. Cl.
CPC ...... *G06F 3/044* (2013.01); *G06F 2203/04103* (2013.01)

(58) Field of Classification Search
CPC ................. G06F 3/044; G06F 3/041
USPC .................................. 345/173–179
See application file for complete search history.

(56) References Cited

U.S. PATENT DOCUMENTS

| | | | |
|---|---|---|---|
| 5,254,413 A * | 10/1993 | Maricocchi | 428/633 |
| 8,124,237 B2 | 2/2012 | Nunez-Regueiro et al. | |
| 8,138,425 B2 | 3/2012 | Lee et al. | |
| 8,173,263 B2 | 5/2012 | Lingle et al. | |
| 8,187,713 B2 | 5/2012 | Lemmer et al. | |
| 8,202,619 B2 | 6/2012 | Thomsen et al. | |
| 8,203,073 B2 | 6/2012 | Lu et al. | |
| 8,263,227 B2 | 9/2012 | Disteldorf et al. | |
| 8,293,344 B2 | 10/2012 | Lemmer et al. | |
| 8,313,620 B2 | 11/2012 | Krasnov | |
| 2004/0086723 A1* | 5/2004 | Thomsen et al. | 428/426 |
| 2009/0314621 A1* | 12/2009 | Hotelling | 200/600 |
| 2010/0013784 A1 | 1/2010 | Nashiki et al. | |
| 2010/0046191 A1* | 2/2010 | den Boer et al. | 361/818 |
| 2011/0193799 A1 | 8/2011 | Jun et al. | |
| 2012/0114919 A1 | 5/2012 | Nakajima et al. | |
| 2012/0227259 A1* | 9/2012 | Badaye et al. | 29/846 |

FOREIGN PATENT DOCUMENTS

WO   WO 2012/099394   7/2012

* cited by examiner

*Primary Examiner* — Alexander Eisen
*Assistant Examiner* — Cory Almeida
(74) *Attorney, Agent, or Firm* — Nixon & Vanderhye P.C.

(57) ABSTRACT

A projected capacitive touch panel, including a substrate, a silver-inclusive transparent conductive coating which forms a plurality of row electrodes, a plurality of column electrodes, and a plurality of conductive traces, and a signal processor which sequentially measures a capacitance between each of row electrodes and an adjacent column electrode. The row electrodes, the plurality of column electrodes, and the plurality of traces are on a plane substantially parallel to the substrate. Each of the row electrodes is electrically connected to the signal processor by one of the plurality of conductive traces. The plurality of traces are at least partially substantially parallel to the column electrodes.

19 Claims, 9 Drawing Sheets

PROJECTED CAPACITIVE TOUCH PANEL WITH A SILVER-INCLUSIVE TRANSPARENT CONDUCTING LAYER(S)

This application relates to a projected capacitive touch panel, specifically a projected capacitive touch panel with a silver-inclusive transparent conducting layer(s).

BACKGROUND

A capacitive touch panel includes an insulator such as glass, coated with a conductive coating. As the human body is also an electrical conductor, touching the surface of the panel results in a distortion of the panel's electrostatic field, measurable as a change in capacitance. A transparent touch panel may be combined with a display such as a liquid crystal panel to form a touchscreen. A projected capacitive (PROCAP) touch panel allows finger or other touches to be sensed through a protective layer in front of the conductive coating. The protective layer increases durability, while the ability to sense touches through an insulator allows a user to operate the touch panel while wearing gloves.

FIGS. 1(a) to 1(g) illustrate an example of a related art projected capacitive touch panel, e.g., see U.S. Pat. No. 8,138,425 the disclosure of which is hereby incorporated herein by reference.

Referring to FIG. 1(a), substrate 11, x-axis conductor 12 for rows, insulator 13, y-axis conductor 14 for columns, and conductive traces 15 are provided. Substrate 11 may be a transparent material such as glass. X-axis conductors 12 and y-axis conductors 14 may be a transparent conductive coating, typically indium tin oxide (ITO). Insulator 13 may be any insulating material (for example, silicon nitride) which inhibits conductivity between x-axis conductors 12 and y-axis conductors 14. Traces 15 provide electrical conductivity between each of the plurality of conductors and a signal processor (not shown).

Referring to FIG. 1(b), x-axis conductor 12 (e.g., ITO) is formed on substrate 11. The ITO is coated in a continuous layer on substrate 11 and then is subjected to a first photolithography process in order to pattern the ITO into x-axis conductors 12. FIG. 1(c) illustrates cross section A-A' of FIG. 1(b), including x-axis conductor 12 formed on substrate 11. Referring to FIG. 1(d), insulator 13 is then formed on the substrate 11 over x-axis channel(s) of x-axis conductor 12. FIG. 1(e) illustrates cross section B-B' of FIG. 1(d), including insulator 13 which is formed on substrate 11 and x-axis conductor 12. The insulator islands 13 shown in FIGS. 1(d)-(e) are formed by depositing a continuous layer of insulating material (e.g., silicon nitride) on the substrate 11 over the conductors 12, and then subjecting the insulating material to a second photolithography, etching, or other patterning process in order to pattern the insulating material into islands 13. Referring to FIG. 1(f), y-axis conductors 14 are then formed on the substrate over the insulator islands 13 and x-axis conductors. The ITO is coated on substrate 11 over 12, 13, and then is subjected to a third photolithography or other patterning process in order to pattern the ITO into y-axis conductors 14. While most of y-axis conductor material 14 is formed directly on substrate 11, the y-axis channel is formed on insulator 13 to inhibit conductivity between x-axis conductors 12 and y-axis conductors 14. FIG. 1(g) illustrates cross section C-C' of FIG. 1(f), including part of a y-axis conductor 14, which is formed on the substrate 11 over insulator island 13 and over an example x-axis conductor 12. It will be appreciated that the process of manufacturing the structure shown in FIGS. 1(a)-(g) requires three deposition steps and three photolithography type processes, which renders the process of manufacture burdensome, inefficient, and costly.

FIG. 1(h) illustrates another example of an intersection of x-axis conductor 12 and y-axis conductor 14 according to a related art projected capacitive touch panel. Referring to FIG. 1(h), an ITO layer is formed on the substrate 11 and can then be patterned into x-axis conductors 12 and y-axis conductors 14 in a first photolithography process. Then, an insulating layer is formed on the substrate and is patterned into insulator islands 13 in a second photolithography or etching process. Then, a metal conductive layer is formed on the substrate 11 over 12-14 and is patterned into conductive bridges 16 in a third photolithography process. Metal bridge 16 provides electrical conductivity for a y-axis conductor 14 over an x-axis conductor 12. Again, this process of manufacture requires three deposition steps and three different photolithography processes.

The projected capacitive touch panels illustrated in FIGS. 1(a) through 1(h) may be mutual capacitive devices and self-capacitive devices.

In a mutual capacitive device, there is a capacitor at every intersection between an x-axis conductor 12 and a y-axis conductor 14 (or metal bridge 16). A voltage is applied to x-axis conductors 12 while the voltage of y-axis conductors 14 is measured (and/or vice versa). When a user brings a finger or conductive stylus close to the surface of the device, changes in the local electrostatic field reduce the mutual capacitance. The capacitance change at every individual point on the grid can be measured to accurately determine the touch location.

In a self-capacitive device, the x-axis conductors 12 and y-axis conductors 14 operate essentially independently. With self-capacitance, the capacitive load of a finger or the like is measured on each x-axis conductor 12 and y-axis conductor 14 by a current meter.

As shown in FIGS. 1(g) and 1(h), related art projected capacitive touch panels require at least three thin film layers (for example, an ITO layer(s), insulator, and another ITO layer or metal bridge) formed on substrate 11 in making the touch-sensitive structure, and possibly a further protective layer(s) thereover. And each thin film layer typically has its own photolithography and/or laser patterning process, which increases production costs and/or time.

As described above, transparent conductors 12 and 14 are typically indium tin oxide (ITO), which is costly. Thin layers of ITO also have a high sheet resistance (at least about 100 ohms/square). In order for an ITO layer to have a sheet resistance less than 5 ohms/sq., the layer must be thick (for example, greater than 400 nm). A thick layer of ITO is both more costly and less transparent. Thus, the high sheet resistance of thin layers of ITO limits its use in layouts requiring long narrow traces on large format touch panels (for example, panels with a diagonal measurement of more than 5 inches). It will be appreciated that there exists a need in the art to address one or more of the above-identified problems.

SUMMARY OF EXAMPLE EMBODIMENTS

These and other limitations may be overcome by a projected capacitive touch panel with a silver-inclusive transparent conductive layer(s), where the silver-inclusive layer may be sandwiched between at least first and second dielectric layers.

In certain exemplary embodiments of this invention, there is provided a projected capacitive touch panel, including: a substrate, a silver-inclusive transparent conductive coating, supported by the substrate, which forms a matrix of row electrodes, a plurality of column electrodes, and a plurality of traces, and a signal processor which sequentially measures a capacitance between each of row electrodes and an adjacent column electrode, wherein the matrix of row electrodes, the plurality of column electrodes, and the plurality of traces are on a plane substantially parallel to the substrate, each of the row electrodes is electrically connected to the signal processor by one of the plurality of traces, and the plurality of traces are substantially parallel to the column electrodes.

In certain exemplary embodiments of this invention, there is provided a method of manufacturing a projected capacitive touch panel including a substrate and a signal processor, the method including depositing a silver-inclusive transparent conductive coating on the substrate to forms a matrix of row electrodes, a plurality of column electrodes, and a plurality of traces, wherein the matrix of row electrodes, the plurality of column electrodes, and the plurality of traces are on a plane substantially parallel to the substrate, each of the row electrodes is electrically connected to the signal processor by one of the plurality of traces, and the plurality of traces are substantially parallel to the column electrodes.

The silver-inclusive transparent conductive coating may include, in order moving away from the substrate: a first silicon-based layer, a first dielectric layer, a second dielectric layer split by a third dielectric layer so as to form first and second portions of the second dielectric layer, a silver layer over and directly contacting the second portion of the second dielectric layer, an upper contact layer comprising an oxide of nickel and/or chromium directly over and contacting the silver layer, a fourth dielectric layer, and a second silicon-based layer, wherein the third dielectric layer comprises either titanium oxide or tin oxide.

DETAILED DESCRIPTION OF EXEMPLARY EMBODIMENTS

Figure 1A:
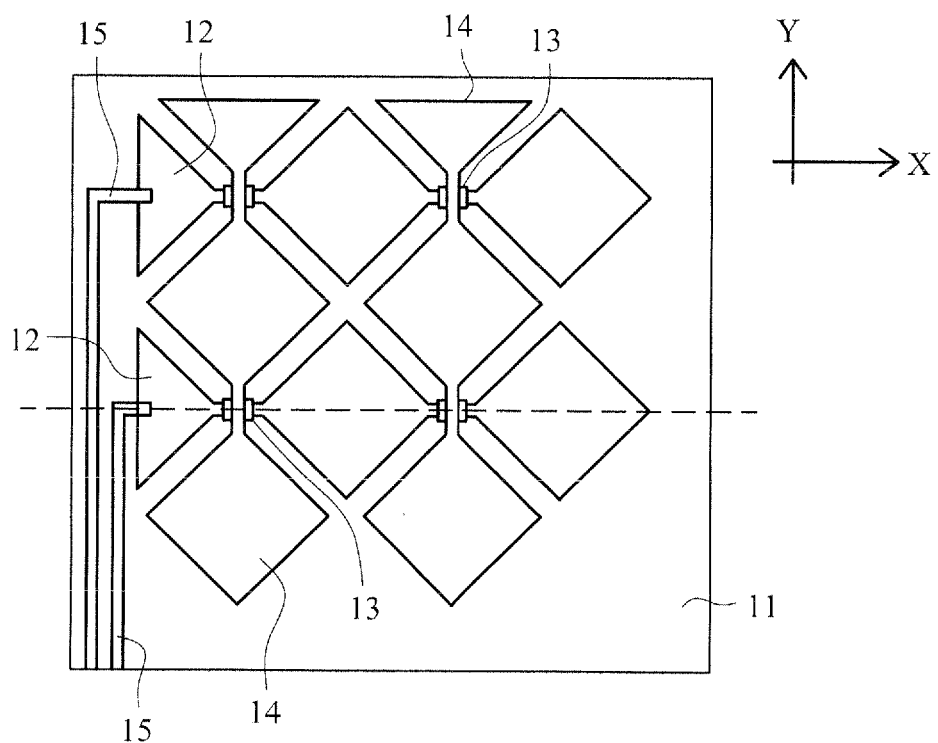
FIGS. 1(a) to 1(h) illustrate examples of related art projected capacitive touch panels.
Figure 1B:
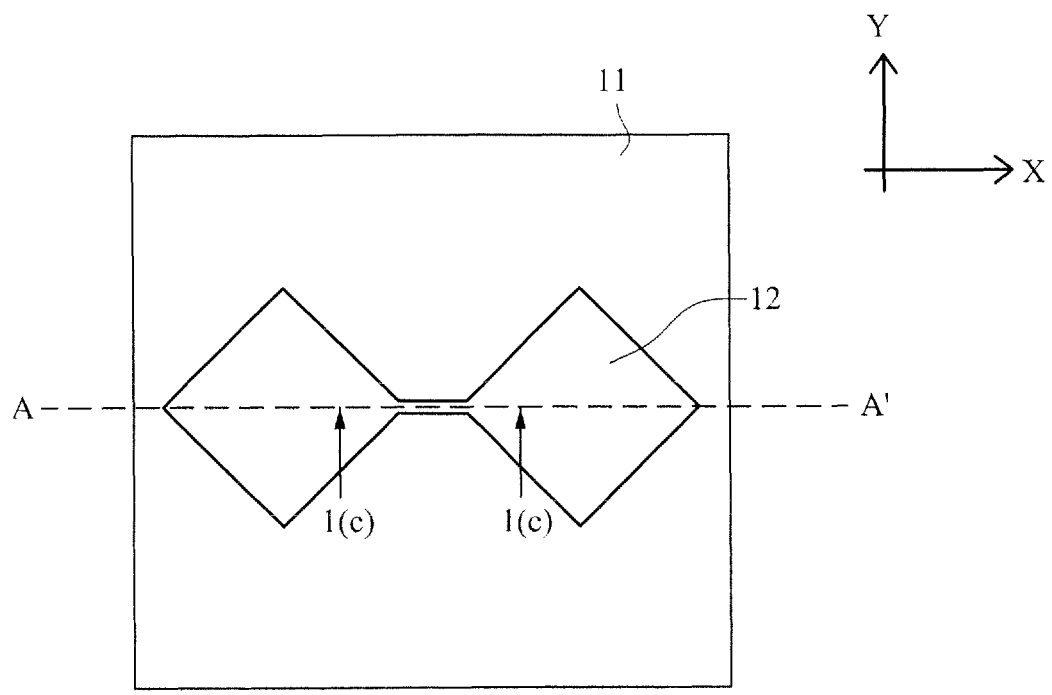
Figure 1C:
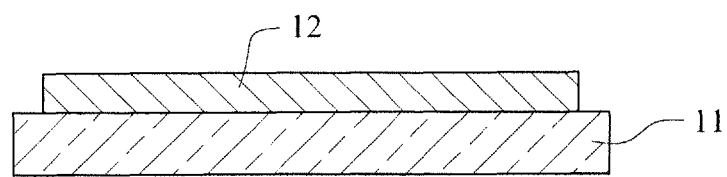
Figure 1D:
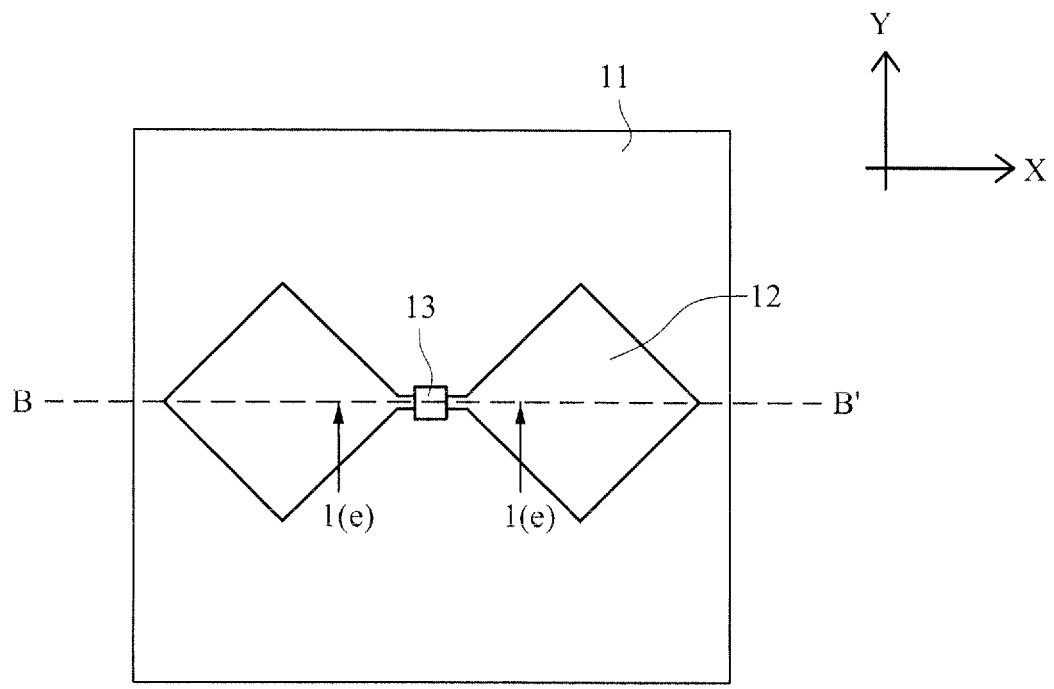
Figure 1E:
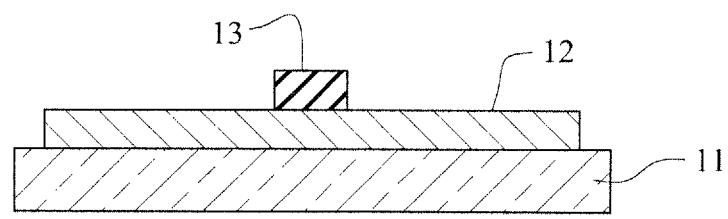
Figure 1F:
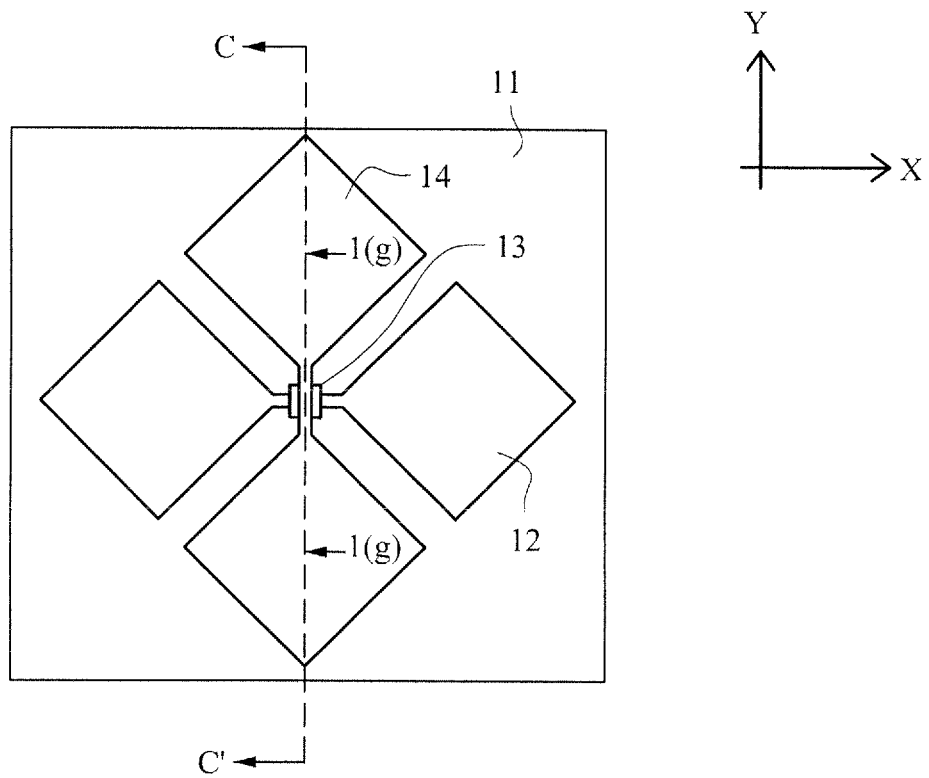
Figure 1G:
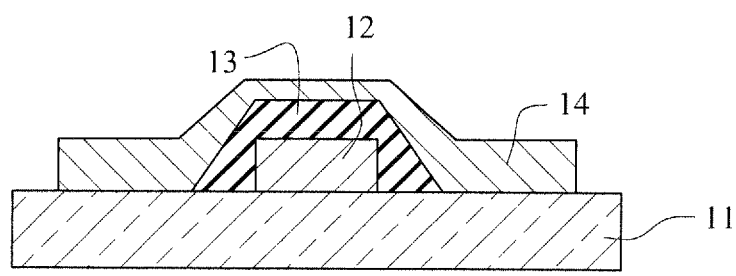
Figure 1H:
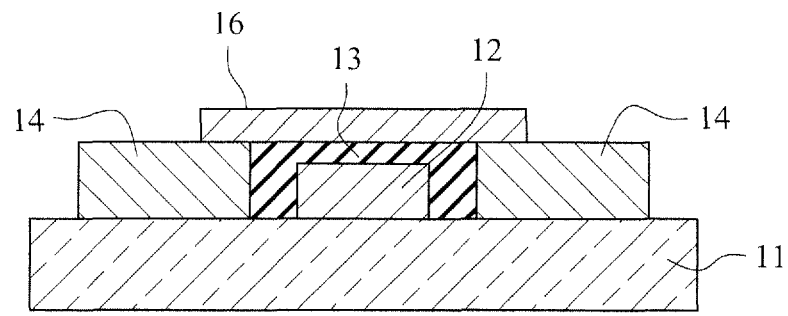

A detailed description of exemplary embodiments is provided with reference to the accompanying drawings. Like reference numerals indicate like parts throughout the drawings.

Figure 2A:
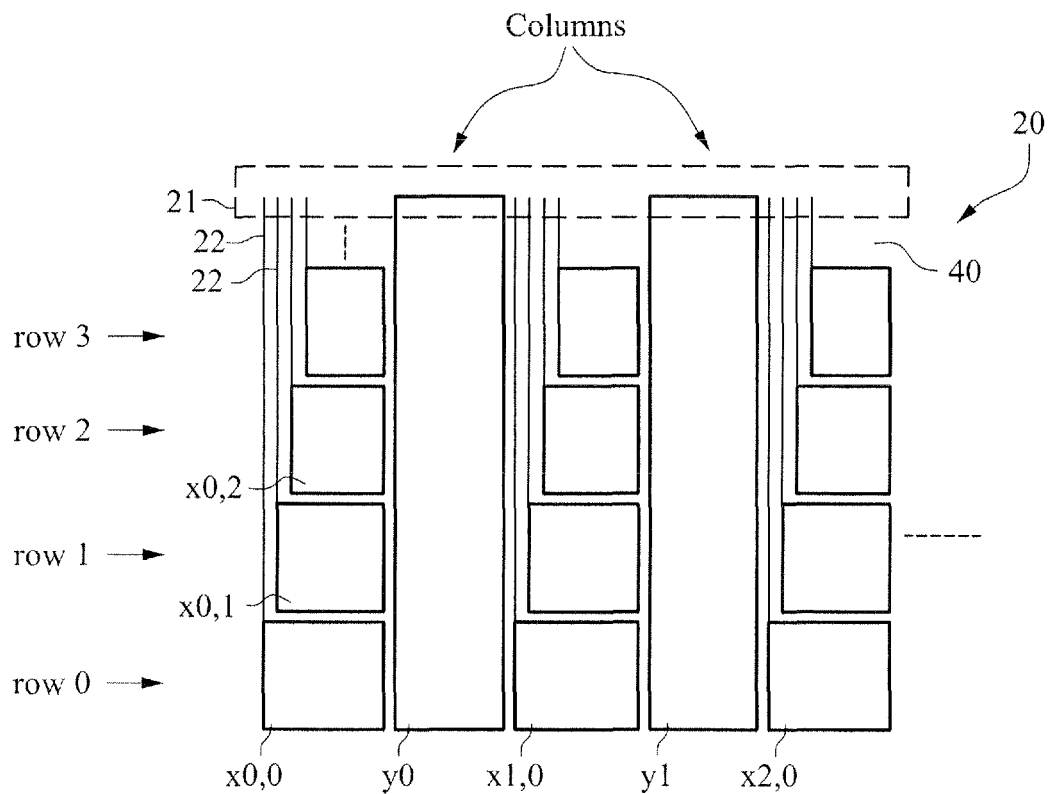
FIG. 2(a) illustrates a top or bottom plan layout of a projected capacitive touch panel according to an exemplary embodiment.

FIG. 2(a) illustrates a top/bottom plan layout of a projected capacitive touch panel according to exemplary embodiments of this invention.

Referring to FIG. 2(a), touch panel 20 is provided. Touch panel 20 includes a matrix of electrodes including n columns and m rows, provided on a substrate 40. The matrix of row/column electrodes is typically provided on the side of the substrate (e.g., glass substrate 40) that is opposite the side touched by person(s) using the touch panel. In other words, when the touch panel is touched by a finger, stylus, or the like, the substrate 40 is typically located between the finger and the matrix of row/column electrodes. Change in capacitance between adjacent row and column electrodes in the matrix as a result of the proximity of a finger or the like is sensed by the electronic circuitry, and the connected circuitry can thus detect where the panel is being touched by a finger or the like.

For example, referring to FIG. 2(a), row 0 includes row electrodes $x_{0,0}$, $x_{1,0}$, $x_{2,0}$, etc., through $x_{n,0}$, and columns 0, 1 and 2 respectively include column electrodes $y_0$, $y_1$, $y_2$, etc., through $y_n$. Optionally, the x electrodes in a column direction may also be grouped for column sensing. The number of row and column electrodes is determined by the size and resolution of the touch panel. In this example, the top-right row electrode is $x_{n,m}$.

Each row electrode $x_{0,0}$-$x_{n,m}$ of touch panel 20 is electrically connected to interconnect area 21 and corresponding processing circuitry/software by a conductive trace 22. Each column electrode $y_0$-$y_n$ is also electrically connected to interconnect area 21 and corresponding processing circuitry/software. The conductive traces 22 are preferably formed of the same transparent conductive material as the row and column electrodes (e.g., same material as at least row electrodes $x_{0,0}$, $x_{1,0}$, $x_{2,0}$, etc.). Thus, in certain example embodiments, the matrix of row and column electrodes and corresponding traces 22 can be formed on the substrate (e.g., glass substrate) 40 by forming a single coating (single or multi-layer coating) on the substrate and by performing only one (or maximum two) photolithography processes. In certain example embodiments, the silver-inclusive coating (e.g., see example coatings of FIGS. 4-6) is deposited (e.g., sputter-deposited) on the substrate 40 and is then subjected to photolithography and/or laser patterning to pattern the silver-inclusive coating into traces 22, row electrodes $x_{0,0}$, $x_{1,0}$, $x_{2,0}$, $x_{0,1}$, $x_{0,2}$, $x_{0,3}$, etc. through $x_{n,m}$, and column electrodes $y_0$-$y_n$.

Because the row electrodes $x_{0,0}$-$x_{n,m}$, column electrodes $y_0$-$y_n$, and traces 22 do not overlap as viewed from above/below, the row electrodes $x_{0,0}$-$x_{n,m}$, column electrodes $y_0$-$y_n$, and traces 22 may be formed on the same plane parallel (or substantially parallel) to substrate 40 on which the electrodes and traces are formed. Significant portions of traces 22 may also be parallel (or substantially parallel) to the column electrodes in the plane parallel (or substantially parallel) to the substrate 40.

Accordingly, touch panel 20 may be made via a smaller number of photolithography or laser patterning steps while achieving traces that achieve sufficient transparency and conductivity, thereby reducing production costs and resulting in a more efficient touch panel for use in a display assembly or the like.

Figure 2B:
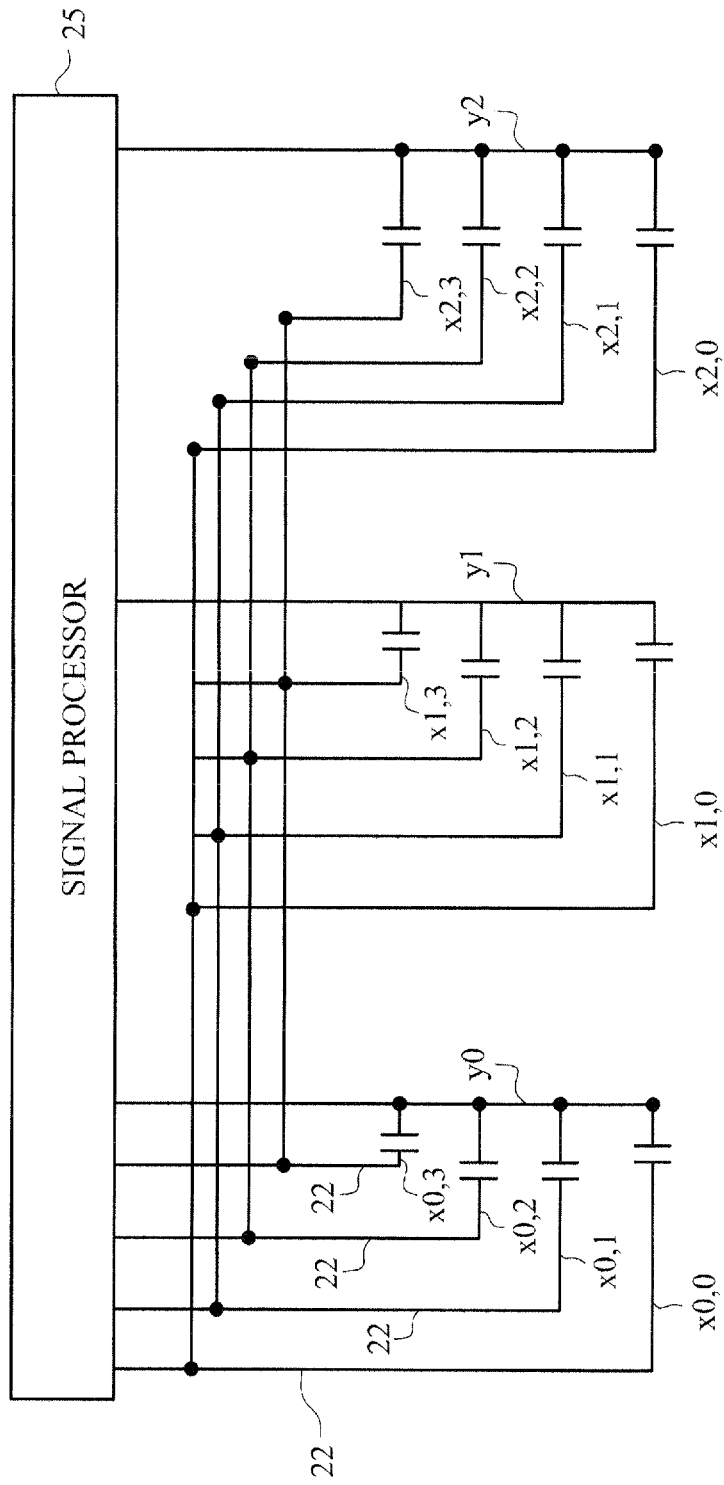
FIG. 2(b) illustrates a schematic representation of circuitry for the projected capacitive touch panel of FIG. 2(a) and/or 3.

FIG. 2(b) illustrates a schematic representation of circuitry for the touch panel 20 illustrated in FIG. 2(a), according to exemplary embodiments.

In touch panel 20, there is a capacitance between each row electrode and the adjacent column electrode (for example, between row electrode $x_{0,0}$ and column electrode $y_0$). This capacitance can be measured by applying a voltage to a column electrode (for example, column electrode $y_0$) and measuring the voltage of an adjacent row electrode (for example, row electrode $x_{0,0}$). When a user brings a finger or conductive stylus close to touch panel 20, changes in the local electrostatic field reduce the mutual capacitance. The capacitance change at individual points on the surface can be measured by measuring each pair of row electrodes and column electrodes in sequence.

The traces 22 of each row electrode in the same row (for example, the traces 22 of row electrodes $x_{0,0}$, $x_{1,0}$, $x_{2,0}$, etc., through $x_{n,0}$ of row 0) may be electrically connected together (as shown in FIG. 2(*b*)). The interconnection of the first row segments to each other, second row segments to each other, etc., may be made on a flexible circuit(s) attached at the periphery of the touch panel in the interconnection area, so that no cross-overs are needed on the glass. In that instance, a voltage is applied to a column electrode and the voltage of each row is measured in sequence before the process is repeated with a voltage applied to another column. Alternatively, each trace 22 may be connected to signal processor 25 and the voltage of each trace 22 may be measured individually.

The same capacitance may be measured by applying a voltage to a row electrode and measuring the voltage on an adjacent column electrode rather than applying a voltage to a column electrode and measuring the voltage of an adjacent row electrode.

Signal processing (for example, applying and measuring voltages, measuring the capacitance between adjacent electrodes, measuring changes in capacitance over time, outputting signals in response to user inputs, etc.) may be performed by signal processor 25. Signal processor 25 may be one or more hardware processors, may include volatile or non-volatile memory, and may include computer-readable instructions for executing the signal processing. Signal processor 25 is electrically connected to the column electrodes $y_0$-$y_n$ and electrically connected to the row electrodes $x_{0,0}$-$x_{n,m}$ through the traces 22. Signal processor 25 may or may not be located on the same plane as row electrodes $x_{0,0}$-$x_{n,m}$ column electrodes $y_0$-$y_n$, and traces 22 (for example, in interconnect area 21 of FIG. 2(*a*)).

Figure 3:
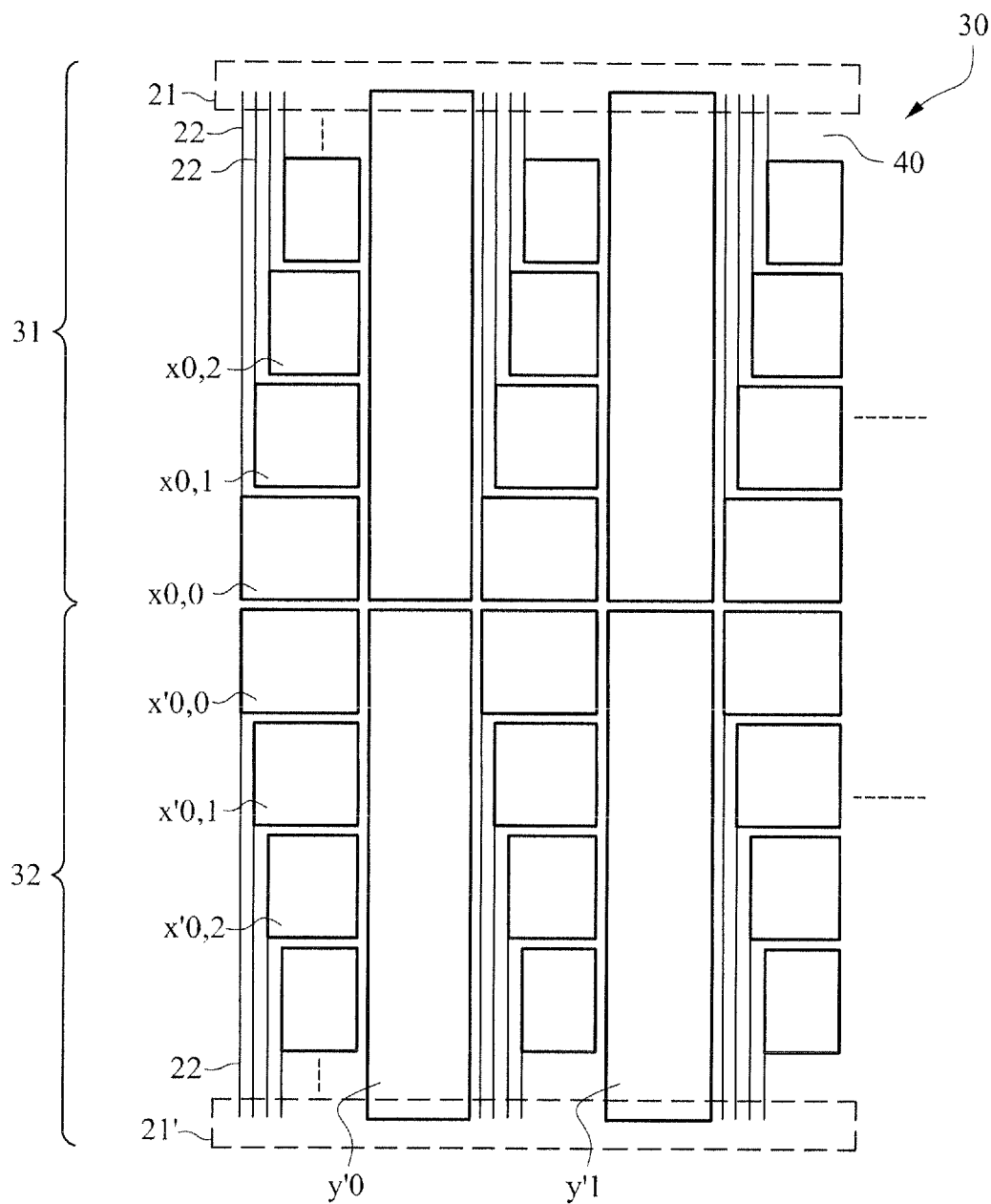
FIG. 3 illustrates a top or bottom plan layout of a projected capacitive touch panel according to another example embodiment.

FIG. 3 illustrates a layout of a projected capacitive touch panel according to other exemplary embodiments.

Referring to FIG. 3, touch panel 30 is similar to touch panel 20 of FIG. 2(*a*), except that touch panel 30 is divided into upper section 31 and lower section 32, each of which includes a matrix of electrodes including n columns and m rows. For example, row 0 of upper section 31 includes row electrodes $x_{0,0}$, $x_{1,0}$, $x_{2,0}$, etc., through $x_{n,0}$. Upper section 31 also includes column electrodes $y_0$, $y_1$, $y_2$, etc., through $y_n$. Likewise, lower section 32 would also include row electrodes, and column electrodes $y_0$-$y_n$ that may be electrically separate from the column electrodes $y_0$-$y_n$ of the upper section 31.

Thus, lower section 32 also includes a matrix of row electrodes including n columns and m rows, and n column electrodes. Lower section 32 may have more or less rows than upper section 31 in different example embodiments.

The number of row and column electrodes of touch panel 30 is determined by the size and resolution of the touch panel.

Each column electrode of upper section 31 is electrically connected to interconnect area 21, and each row electrode of upper section 31 is electrically connected to interconnect area 21 by a trace 22. As with the FIG. 2 embodiment, traces may or may not be used for connecting the column electrodes of upper section 31 to the interconnect area. Each column electrode of lower section 32 is electrically connected to interconnect area 21' and each row electrode of lower section 32 is electrically connected to interconnect area 21' by a trace 22. Again, traces may or may not be used for connecting the column electrodes of the lower section 32 to the interconnect area 21'

Still referring to FIG. 3, touch panel 30 is similar to touch panel 20 in that there is a capacitance between each row electrode and the adjacent column electrode which may be measured by applying a voltage to a column electrode and measuring the voltage of an adjacent row electrode (or, alternatively, by applying a voltage to a row electrode and measuring the voltage of an adjacent column electrode). When a user brings a finger or conductive stylus close to touch panel 30, changes in the local electrostatic field reduce the mutual capacitance. The capacitance change at individual points on the surface can be measured by measuring the mutual capacitance of each pair of row electrodes and column electrodes in sequence.

Because the row electrodes and column electrodes illustrated in FIG. 3 do not overlap, the row electrodes and column electrodes may be formed on the same plane, in the manner explained above in connection with FIG. 2. Accordingly, electrode structure for the touch panel 30 may be thin in nature and may be patterned with one process (for example, one photolithography process or one laser patterning process) which reduces the production cost of the projected capacitive touch panel.

As one of ordinary skill in the art would recognize, touch panels 20 and 30 described are not limited to the orientation described above and shown in FIGS. 2-3. In other words, the terms "row," "column" "x-axis," and "y-axis" as used in this application are not meant to imply a specific direction. Touch panel 20 of FIG. 2(*a*), for example, may be modified or rotated such that interconnect area 21 is located in any part of touch panel 20.

As illustrated in FIGS. 2(*a*) and 3, narrow transparent conductive traces 22 are routed to electrically connect electrodes to interconnect area 21 (and interconnect area 21'). Because of the large resistance of the narrow ITO traces, narrow ITO traces may only been used in small touch panels, such as for smart phones. To use one of the layouts illustrated in FIGS. 2(*a*) and 3 on larger touch panels (for example, measuring more than 10 inches diagonally), a transparent conductive coating with low sheet resistance must be used. The silver inclusive coatings shown in FIGS. 4-6, for use in forming the row/column electrodes and traces 22, are advantageous in this respect because they have a much lower sheet resistance than typical conventional ITO traces.

Figure 4:
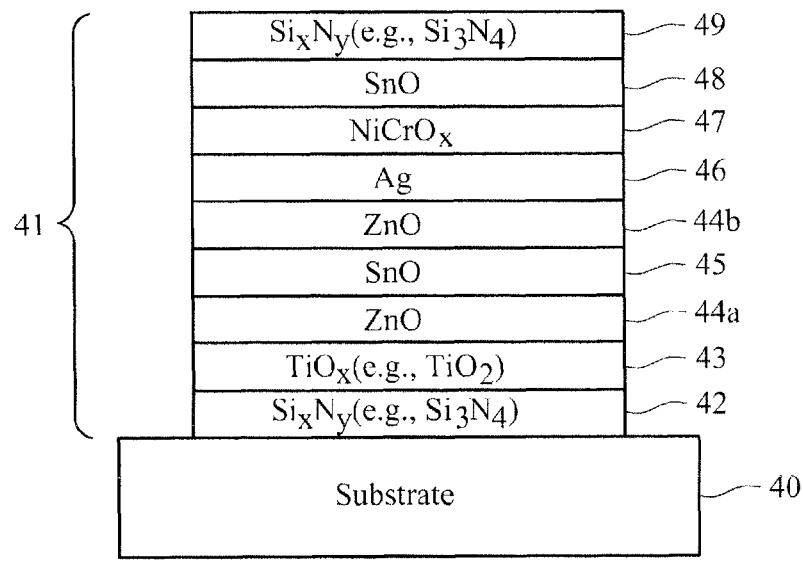
FIG. 4 illustrates a cross-sectional view of a silver-inclusive transparent conductive coating for a touch panel of FIGS. 2-3, according to exemplary embodiments.
Figure 5:
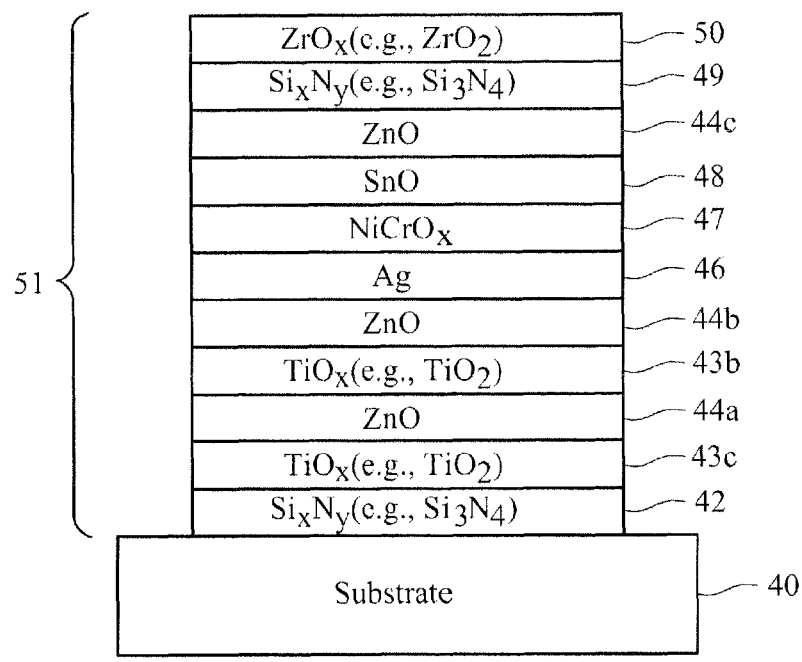
FIG. 5 illustrates a cross-sectional view of another example silver-inclusive transparent conductive coating for a touch panel of FIGS. 2-3.
Figure 6:
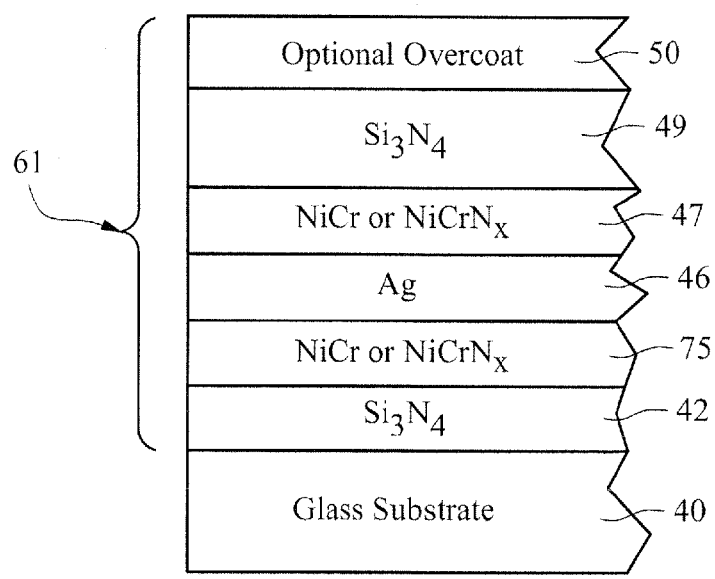
FIG. 6 illustrates a cross-sectional view of yet another example silver-inclusive transparent conductive coating for a touch panel of FIGS. 2-3.

Examples of silver-inclusive transparent conductive coatings (TCCs) with low sheet resistance, for forming row electrodes, column electrodes, and traces 22 are illustrated in FIGS. 4-6, according to exemplary embodiments. In each of FIGS. 4-6, the low sheet resistance and high transparency of the TCC allow the TCC to form the long narrow traces 22 of the touch panels illustrated in FIGS. 2(*a*) and 3, as well as the row and column electrodes.

Referring to FIG. 4, coating (or layer system) 41 is provided, either directly or indirectly, on substrate 40. Substrate 40 may be, for example, glass. Coating 41 may include, for example, bottom dielectric silicon nitride based and/or inclusive layer 42 which may be $Si_3N_4$ (which may or may not be doped with other material(s) such as aluminum in certain example instances) or of the Si-rich type for haze reduction, or of any other suitable stoichiometry silicon nitride in different embodiments of this invention; a dielectric high index layer 43 of or including a material such as titanium oxide or niobium oxide, which may include titanium oxide (e.g., $TiO_2$ or other suitable stoichiometry); and first and second dielectric layers of or including zinc oxide 44*a* and 44*b* that may be split by a dielectric "glue" layer 45 of or including tin oxide; a silver-based conductive layer 46; an upper contact layer including nickel and/or chromium 47 which may be oxided and/or nitrided; a second layer of or including tin oxide 48; and an outer-most protective layer 49 of or including silicon nitride. The dielectric high index layer 43 may be fully oxidized or sub-stoichiometric in different example embodiments. The seed layer comprising zinc oxide 44b and the upper contact layer of or including nickel and/or chromium 47 directly contact the silver-based conductive layer 46.

While various thicknesses and materials may be used in layers in different embodiments of this invention, example thicknesses and materials for the respective sputter-deposited layers of coating 41 on the glass substrate 40 in the FIG. 4 embodiment are as follows, from the glass substrate outwardly:

TABLE 1

| Ref | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 100-300 | 160 | 160 |
| 43 | $TiO_x$ | 75-125 | 85-115 | 100 | 100 |
| 44a | ZnO | 35-75 | 40-70 | 60 | 50 |
| 45 | SnO | 35-200 | 50-135 | 100 | 70 |
| 44b | ZnO | 30-200 | 40-130 | 60 | 100 |
| 46 | Ag | 60-110 | 70-100 | 85 | 85 |
| 47 | NiCrOx | 20-40 | 23-37 | 30 | 30 |
| 48 | SnO | 150-275 | 170-255 | 220 | 200 |
| 49 | $Si_xN_y$ | 1-1000 | 100-500 | 220 | 250 |

In certain example embodiments, the layers 44a and 44b may have matching or substantially matching thicknesses. For instance, the thicknesses of these layers may differ by no more than 15% in certain example instances, no more than 10% in other example instances, and no more than 3-5% in yet other example instances. This is the case with Example 1 above, but is not the case with Example 2 above.

Referring to FIG. 5, another example transparent conductive coating (or layer system) 51 is provided, either directly or indirectly, on substrate 40. Substrate 40 may be, for example, glass. As with the FIG. 4 embodiment, FIG. 5 includes, for example, bottom dielectric silicon nitride based and/or inclusive layer 42 and a dielectric high index layer 43a, which may be of or include titanium oxide or niobium oxide (e.g., $TiO_2$ or other suitable stoichiometry). However, as shown in FIG. 5, the first and second dielectric layers comprising zinc oxide 44a and 44b (which may be doped with Al or the like) are split by a layer of or including titanium oxide (e.g., $TiO_2$ or other suitable stoichiometry) 43b. Another way of thinking about this is that the lower dielectric high index layer comprising titanium oxide 43 is split into two sub-layers (43a and 43b) by a First layer of or including zinc oxide 44a. An upper contact layer including nickel and/or chromium 47, which may be oxided and/or nitrided, a layer of or including tin oxide 48, a dielectric layer of or including zinc oxide 44c, and another dielectric silicon nitride based layer 49 may be provided above a conductive silver-based layer 46. A third zinc oxide inclusive layer 44c may be interposed between the layer comprising tin oxide 48 and the silicon nitride based layer 49. An optional zirconium oxide inclusive top coat 50 is shown as an outer-most layer (and thus above the silicon nitride based layer 49) in FIG. 5. This zirconium oxide inclusive top coat 50 may provide further durability improvements.

While various thicknesses and materials may be used in layers in different embodiments of this invention, example thicknesses and materials for the respective sputter-deposited layers on the substrate 40 in the FIG. 5 embodiment are as follows, from the substrate 40 outwardly:

TABLE 2

| Ref. | Material | Preferred Thickness (Å) | More Preferred Thickness (Å) | Example Thickness 1 (Å) | Example Thickness 2 (Å) |
|---|---|---|---|---|---|
| 42 | $Si_xN_y$ | 1-500 | 10-300 | 156 | 156 |
| 43c | $TiO_x$ | 15-50 | 30-40 | 33 | 35 |
| 44a | ZnO | 70-200 | 95-125 | 114 | 110 |
| 43b | $TiO_x$ | 15-50 | 30-40 | 33 | 35 |
| 44b | ZnO | 70-200 | 95-125 | 114 | 110 |
| 46 | Ag | 70-120 | 80-100 | 90 | 90 |
| 47 | NiCrOx | 1-100 | 10-50 | 30 | 30 |
| 48 | SnO | 110-150 | 115-145 | 130 | 130 |
| 44c | ZnO | 70-200 | 95-125 | 109 | 109 |
| 49 | $Si_xN_y$ | 115-185 | 125-155 | 140 | 140 |
| 50 | $ZrO_x$ | 1-200 | 10-80 | 40 | 40 |

FIG. 6 illustrates another example transparent conductive coating that may be used to form the row and column electrodes, and traces 22, in FIGS. 2-3. The coating of FIG. 6 includes, from the glass substrate 40 outwardly, dielectric layer of or including silicon nitride, lower contact layer 75 of or including NiCr, NiCrOx, NiCrNx or the like, conductive layer 46 of or including silver, upper contact layer 47 of or including NiCr, NiCrOx, NiCrNx or the like, dielectric layer 49 of or including silicon nitride, and optional overcoat 50 of a material such as zirconium oxide.

A projected capacitive touch panel may be formed by using a silver-inclusive TCC (for example, coating 41 of FIG. 4, coating 51 of FIG. 5, or coating 61 of FIG. 6) patterned on a substrate 40 (for example, glass) in a layout to form the row electrodes $x_{0,0}$, $x_{n,m}$, column electrodes $y_0$-$y_n$, and traces 22 of touch panels 20 or 30 illustrated in FIGS. 2-3. Because the silver-inclusive TCC may be patterned with one photolithography process and/or laser patterning process, the overall cost of the projected capacitive panel is reduced.

Figure 7:
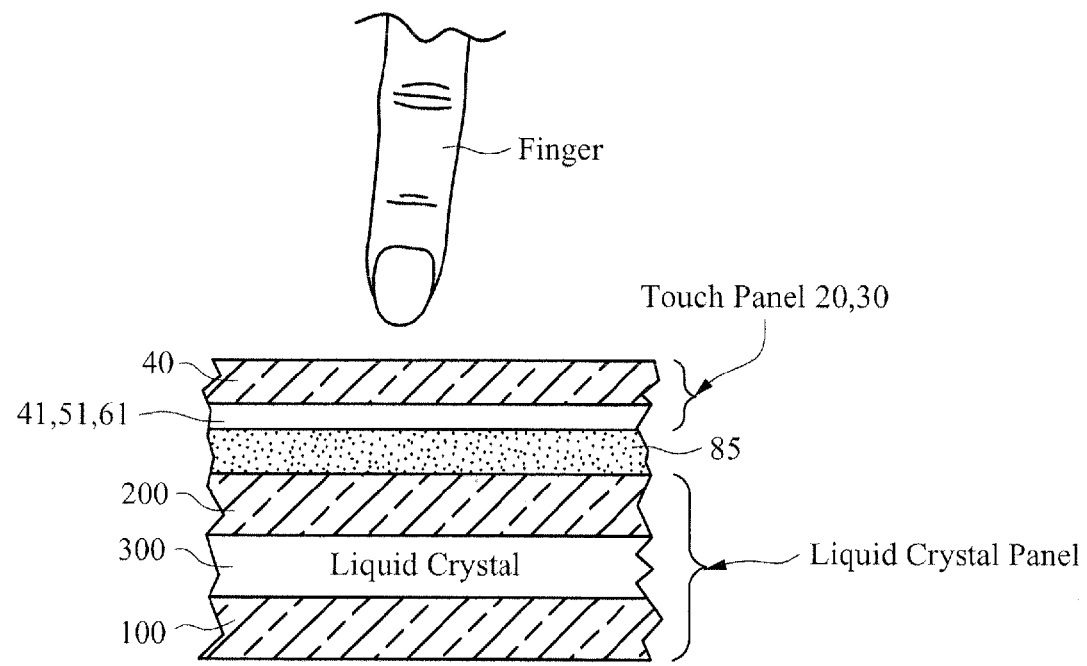
FIG. 7 is a cross sectional view of a display assembly according to an example embodiment of this invention, including a touch panel according to any of FIGS. 2-6 coupled to a liquid crystal panel, for use in electronic devices such as portable phones, portable pads, computers, and/or so forth.

Silver-inclusive TCCs 41, 51, 61 are inexpensive, have a low sheet resistance (preferably less than 15 ohms/square, more preferably less than about 10 or 5 ohms/square, with an example being approximately 4 ohms per square) and maintain high transmittance (preferably, greater than 70%, more preferably greater than about 80 percent). The TCC (41, 51 or 61) may be deposited on a major surface of the substrate 40 away from the user so as to reduce corrosive exposure to the atmosphere or contact with a finger or stylus. For example, the example display assembly shown in FIG. 7 includes a touch panel (20 or 30) mounted on a liquid crystal display panel. The row electrodes, column electrodes, and traces are form at 41, 51, 61 in FIG. 7 on the surface of the glass substrate 40 opposite the finger, and the touch panel (20, 30) may be adhered to the LCD panel via an index-matching adhesive layer 85. The LCD panel includes first and second substrates (e.g., glass substrates) 100, 200 with a liquid crystal layer 300 provided therebetween. In order to form a touch-screen, the touch panel 20, 30 may be mounted on the LCD panel with a small air gap (not shown), or bonded to the display with an index-matching adhesive 85.

The pixel pitch for projected capacitive touch panels may, for example, be in the range of from about 6 to 7 mm. Touch location can be determined more accurately, to about 1 mm, by signal processing and interpolation. If the line width/spacing for the traces 22 is approximately 10 μm to 20 μm, it can be calculated that a projected capacitive touch panel of at least 20 inches (measured diagonally) is possible for a TCC sheet resistance of about 4 ohms/square. Further optimization of the routing, signal processing and/or noise suppression allows for production of even larger touch panels (for example, up to 40 or 50 inches diagonally).

In certain exemplary embodiments, glass substrate 40 with coating 41, 51, 61 thereon may be heat treated (e.g., thermally tempered), e.g., after coating, or chemically strengthened before coating.

In certain example embodiments of this invention there is provided a capacitive touch panel comprising: a substrate; a multi-layer transparent conductive coating including at least one conductive layer comprising silver, which is supported by the substrate, a plurality of row electrodes, a plurality of column electrodes, and a plurality of conductive traces, wherein the row electrodes, the column electrodes and the conductive trances comprise the multi-layer transparent conductive coating; a processor which measures capacitance between row and column electrodes in detecting touch position on the touch panel, wherein the row electrodes, the column electrodes, and the conductive traces are formed substantially in a common plane substantially parallel to the substrate, wherein each of the row electrodes is electrically connected to the processor by at least one of the conductive traces, and wherein the conductive traces are at least partially substantially parallel to the column electrodes.

In the capacitive touch panel of the immediately preceding paragraph, the transparent conductive coating may comprise, moving away from the substrate: a first dielectric layer comprising silicon nitride; a dielectric layer comprising metal(s) oxide; a conductive layer comprising silver; an upper contact layer over and contacting the conductive layer comprising silver; and a second dielectric layer comprising silicon nitride. The dielectric layer comprising metal(s) oxide may comprise zinc oxide or an oxide of NiCr for example. The upper contact layer may comprise Ni and/or Cr. The transparent conductive coating may further comprise a dielectric layer comprising titanium oxide located between at least the first dielectric layer comprising silicon nitride and the dielectric layer comprising metal(s) oxide. The transparent conductive coating may comprise, between at least the first dielectric layer comprising silicon nitride and the dielectric layer comprising metal(s) oxide, a layer comprising titanium oxide, a layer comprising zinc oxide, and a layer comprising tin oxide. The transparent conductive coating may comprise, between at least the first dielectric layer comprising silicon nitride and the dielectric layer comprising metal(s) oxide, a layer comprising titanium oxide, a layer comprising zinc oxide, and another layer comprising titanium oxide. The coating may further comprise an overcoat comprising zirconium oxide. The transparent conductive coating may comprise, moving away from the substrate: a first dielectric layer comprising silicon nitride; a lower contact layer comprising Ni and/or Cr; a conductive layer comprising silver directly contacting the lower contact layer; an upper contact layer comprising Ni and/or Cr contacting the conductive layer comprising silver; and a second dielectric layer comprising silicon nitride.

In the capacitive touch panel of any of the preceding two paragraphs, the transparent conductive coating may have a sheet resistance of less than or equal to about 15 ohms/square, more preferably of less than or equal to about 10 or 5 ohms/square.

A display assembly may comprise the capacitive touch panel of any of the preceding three paragraphs coupled to a liquid crystal panel, wherein the liquid crystal panel includes a pair of substrates with a liquid crystal layer provided therebetween.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A capacitive touch panel, comprising:
   a substrate;
   a multi-layer transparent conductive coating supported by the substrate, the multi-layer transparent conductive coating including at least one conductive layer comprising silver, a dielectric layer comprising zinc oxide under and directly contacting the conductive layer comprising silver, and a dielectric layer(s) comprising tin oxide or silicon nitride over the conductive layer comprising silver,
   a plurality of row electrodes, a plurality of column electrodes, and a plurality of conductive traces, wherein the row electrodes, the column electrodes and the conductive traces include the multi-layer transparent conductive coating;
   a processor which measures capacitance between row and column electrodes in detecting touch position on the touch panel,
   wherein the row electrodes, the column electrodes, and the conductive traces are formed substantially in a common plane substantially parallel to the substrate,
   wherein each of the row electrodes is electrically connected to the processor by at least one of the conductive traces,
   wherein the row electrodes get progressively smaller in size moving away from a given edge of the touch panel, so that row electrodes in areas where many conductive traces from row electrodes are present are smaller in size than are row electrodes in areas where fewer conductive traces from row electrodes are present, and
   wherein the conductive traces are at least partially substantially parallel to the column electrodes.

2. The capacitive touch panel of claim 1, wherein the transparent conductive coating comprises, moving away from the substrate:
   a first dielectric layer comprising silicon nitride;
   the dielectric layer comprising zinc oxide;
   the conductive layer comprising silver;
   an upper contact layer over and contacting the conductive layer comprising silver; and
   a second dielectric layer comprising silicon nitride.

3. The capacitive touch panel of claim 2, wherein the transparent conductive coating further comprises a dielectric layer comprising titanium oxide located between at least the first dielectric layer comprising silicon nitride and the dielectric layer comprising zinc oxide.

4. The capacitive touch panel of claim 2, wherein the transparent conductive coating further comprises, between at least the first dielectric layer comprising silicon nitride and the dielectric layer comprising zinc oxide, a layer comprising titanium oxide, another layer comprising zinc oxide, and a layer comprising tin oxide.

5. The capacitive touch panel of claim 2, wherein the transparent conductive coating further comprises, between at least the first dielectric layer comprising silicon nitride and the dielectric layer comprising zinc oxide, a layer comprising titanium oxide, another dielectric layer comprising zinc oxide, and another layer comprising titanium oxide.

6. The capacitive touch panel of claim 2, wherein the coating further comprises an overcoat comprising zirconium oxide.

7. The capacitive touch panel of claim 1, wherein the transparent conductive coating has a sheet resistance of less than or equal to about 15 ohms/square.

8. The capacitive touch panel of claim 1, wherein the transparent conductive coating has a sheet resistance of less than or equal to about 10 ohms/square.

9. The capacitive touch panel of claim 1, wherein the transparent conductive coating has a sheet resistance of less than or equal to about 5 ohms/square.

10. A display assembly comprising the capacitive touch panel of claim 1 coupled to a liquid crystal panel, the liquid crystal panel including a pair of substrates with a liquid crystal layer provided therebetween.

11. A capacitive touch panel, comprising:
   a substrate of the capacitive touch panel;
   a multi-layer transparent conductive coating supported by the substrate, the multi-layer transparent conductive coating including at least one conductive layer comprising silver, a dielectric layer comprising zinc oxide under and directly contacting the conductive layer comprising silver, and a dielectric layer(s) comprising tin oxide or silicon nitride over the conductive layer comprising silver,
   a plurality of row electrodes, a plurality of column electrodes, and a plurality of conductive traces, wherein the row electrodes, the column electrodes and the conductive traces include the multi-layer transparent conductive coating;
   a processor for measuring capacitance between row and column electrodes to be implemented in detecting touch position on the touch panel,
   wherein the row electrodes, the column electrodes, and the conductive traces are formed substantially in a common plane substantially parallel to the substrate, and
   wherein each of the row electrodes is electrically connected to the processor by at least one of the conductive traces.

12. The capacitive touch panel of claim 11, wherein the transparent conductive coating comprises, moving away from the substrate:
   a first dielectric layer comprising silicon nitride;
   the dielectric layer comprising zinc oxide;
   the conductive layer comprising silver;
   a layer over and contacting the conductive layer comprising silver; and
   a second dielectric layer comprising silicon nitride.

13. The capacitive touch panel of claim 12, wherein the layer over and contacting the conductive layer comprising silver comprises Ni and/or Cr.

14. The capacitive touch panel of claim 12, wherein the transparent conductive coating further comprises a dielectric layer comprising titanium oxide located between at least the first dielectric layer comprising silicon nitride and the dielectric layer comprising zinc oxide.

15. The capacitive touch panel of claim 12, wherein the transparent conductive coating further comprises, between at least the first dielectric layer comprising silicon nitride and the dielectric layer comprising zinc oxide, a layer comprising titanium oxide, another layer comprising zinc oxide, and a layer comprising tin oxide.

16. The capacitive touch panel of claim 12, wherein the transparent conductive coating further comprises, between at least the first dielectric layer comprising silicon nitride and the dielectric layer comprising zinc oxide, a layer comprising titanium oxide, another dielectric layer comprising zinc oxide, and another layer comprising titanium oxide.

17. The capacitive touch panel of claim 12, wherein the coating further comprises an overcoat comprising zirconium oxide.

18. The capacitive touch panel of claim 11, wherein the transparent conductive coating has a sheet resistance of less than or equal to about 15 ohms/square.

19. The capacitive touch panel of claim 11, wherein the transparent conductive coating has a sheet resistance of less than or equal to about 10 ohms/square.

* * * * *